United States Patent
Nedeltchev et al.

(10) Patent No.: US 9,264,422 B2
(45) Date of Patent: Feb. 16, 2016

(54) SECURE NETWORK DEPLOYMENT

(71) Applicant: Cisco Technology, Inc., San Jose, CA (US)

(72) Inventors: Plamen Nedeltchev, San Jose, CA (US); Robert T. Bell, Bountiful, UT (US); Max Pritikin, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/248,065

(22) Filed: Apr. 8, 2014

(65) Prior Publication Data

US 2014/0223530 A1  Aug. 7, 2014

Related U.S. Application Data

(62) Division of application No. 11/465,598, filed on Aug. 18, 2006, now Pat. No. 8,732,279.

(51) Int. Cl.
*G06F 7/04* (2006.01)
*H04L 29/06* (2006.01)
*H04L 29/08* (2006.01)

(52) U.S. Cl.
CPC ........ *H04L 63/0823* (2013.01); *H04L 63/0876* (2013.01); *H04L 63/0892* (2013.01); *H04L 67/303* (2013.01)

(58) Field of Classification Search
CPC ........................ H04L 63/0823; H04L 63/0876
See application file for complete search history.

(56) References Cited

U.S. PATENT DOCUMENTS

| | | | |
|---|---|---|---|
| 5,633,910 A | 5/1997 | Cohen | |
| 5,930,479 A | 7/1999 | Hall | |
| 5,971,854 A | 10/1999 | Pearson et al. | |
| 6,141,345 A | 10/2000 | Goeddel et al. | |
| 6,185,288 B1 | 2/2001 | Wong | |
| 6,199,099 B1 | 3/2001 | Gershman et al. | |
| 6,219,423 B1 | 4/2001 | Davis | |
| 6,226,678 B1 | 5/2001 | Mattaway et al. | |
| 6,243,443 B1 | 6/2001 | Low et al. | |
| 6,493,673 B1 | 12/2002 | Ladd et al. | |
| 6,584,490 B1 | 6/2003 | Schuster et al. | |
| 6,678,720 B1 | 1/2004 | Matsumoto et al. | |
| 6,687,245 B2 | 2/2004 | Fangman et al. | |
| 6,691,155 B2 | 2/2004 | Gottfried | |
| 6,744,759 B1 | 6/2004 | Sidhu et al. | |
| 6,757,363 B1 | 6/2004 | Platt et al. | |
| 6,791,970 B1 | 9/2004 | Ng et al. | |

(Continued)

FOREIGN PATENT DOCUMENTS

| | | |
|---|---|---|
| CA | 2555567 | 9/2005 |
| JP | 2003092629 | 9/2001 |
| WO | WO2005081479 | 9/2005 |

OTHER PUBLICATIONS

AGP Telecom Inc., IPCom Suite of VoIP Products, 2003, 2 pages, www.agptelecom.com/ns/p11.php.

(Continued)

*Primary Examiner* — Esther B Henderson
(74) *Attorney, Agent, or Firm* — Lempia Summerfield Katz LLC

(57) ABSTRACT

In one embodiment, a Manufacturer Installed Certificate (MIC) and a personal identification number are sent to a call controller to request a configuration profile. When the configuration file is received, the IP phone is provisioned according to the configuration profile.

11 Claims, 8 Drawing Sheets

(56) References Cited

U.S. PATENT DOCUMENTS

| | | | |
|---|---|---|---|
| 6,839,841 B1 | 1/2005 | Medvinsky et al. | |
| 6,845,499 B2 | 1/2005 | Srivastava et al. | |
| 6,856,616 B1 | 2/2005 | Schuster et al. | |
| 6,958,992 B2 | 10/2005 | Lee et al. | |
| 6,999,458 B2 | 2/2006 | Fowler | |
| 7,023,989 B1 | 4/2006 | Turner et al. | |
| 7,031,288 B2 | 4/2006 | Ogier | |
| 7,278,028 B1 | 10/2007 | Hingoranee | |
| 7,353,388 B1 | 4/2008 | Gilman et al. | |
| 7,673,021 B2 | 3/2010 | Tasker et al. | |
| 8,122,244 B2 * | 2/2012 | Azema et al. | 713/156 |
| 8,130,769 B2 | 3/2012 | West et al. | |
| 8,144,692 B2 | 3/2012 | Haddad et al. | |
| 2001/0037394 A1 | 11/2001 | Yoshimura et al. | |
| 2002/0064149 A1 | 5/2002 | Elliott et al. | |
| 2002/0131402 A1 | 9/2002 | Lee et al. | |
| 2002/0174240 A1 | 11/2002 | Nason et al. | |
| 2003/0055912 A1 | 3/2003 | Martin, Jr. et al. | |
| 2003/0108172 A1 | 6/2003 | Petty et al. | |
| 2003/0135595 A1 | 7/2003 | Segelstein | |
| 2003/0137991 A1 | 7/2003 | Doshi et al. | |
| 2003/0217122 A1 | 11/2003 | Roese et al. | |
| 2003/0223403 A1 | 12/2003 | Higgins | |
| 2004/0030923 A1 | 2/2004 | Tindal et al. | |
| 2004/0031030 A1 | 2/2004 | Kidder et al. | |
| 2004/0058710 A1 | 3/2004 | Timmins et al. | |
| 2004/0121813 A1 | 6/2004 | Colson et al. | |
| 2004/0156490 A1 | 8/2004 | Adams et al. | |
| 2004/0180646 A1 | 9/2004 | Donley et al. | |
| 2004/0243701 A1 | 12/2004 | Hardwicke et al. | |
| 2004/0260795 A1 | 12/2004 | Gentle et al. | |
| 2004/0264665 A1 | 12/2004 | Idoni et al. | |
| 2005/0008136 A1 | 1/2005 | Dobner et al. | |
| 2005/0027985 A1 * | 2/2005 | Sprunk et al. | 713/171 |
| 2005/0036663 A1 | 2/2005 | Caspi et al. | |
| 2005/0180403 A1 | 8/2005 | Haddad et al. | |
| 2005/0198218 A1 | 9/2005 | Tasker et al. | |
| 2006/0174106 A1 * | 8/2006 | Bell et al. | 713/156 |
| 2006/0258344 A1 | 11/2006 | Chen | |
| 2007/0022294 A1 * | 1/2007 | Lapstun et al. | 713/176 |
| 2009/0154681 A1 | 6/2009 | Kung et al. | |

OTHER PUBLICATIONS

Alvin Ang, IP Telephone, Dept. of Information Technology and Electrical Engineering, Oct. 18, 2002, Univeristy of Queensland.

Cisco Systems, Inc., Cisco ATA 186 and Cisco ATA 188 Analog Telephone Adapter, User Guide, 2004, pp. 1-29.

Cisco Systems, Inc., Device Configuration with TAPS and BAT in Cisco CallManager Administration, Document ID 46472, Jul. 12, 2006, pp. 1-29.

Cisco Systems, Inc., Installing and Configuring the IE2100 Series, Chapter 3, Date Unknown, pp. 1-12, Installation Manual.

Cisco Systems, Inc., Linksys Wireless-G IP Phone User Guide, 2006, pp. 1-75.

Client Applications, Client Applications, 2006, 1 page, www.broadsoft.com/ProductslProducts_Client_Apps.htm.

* cited by examiner

SECURE NETWORK DEPLOYMENT

CROSS-REFERENCE TO RELATED APPLICATIONS

This application is a divisional under 37 C.F.R. §1.53(b) and 35 U.S.C. §121 of U.S. patent application Ser. No. 11/465,598 filed Aug. 18, 2006, which is incorporated herein by reference in its entirety.

BACKGROUND

Improvements in communications and computing technologies allow conventional real-time applications over a packet switched network. For example, in a Voice over Internet Protocol (VoIP) network, audio information is converted from analog to digital format and sent through a packet switched network. This allows for delivery of audio information at a lower cost than through a dedicated Publicly Switched Telephone Network (PSTN) circuit; however, VoIP systems have complicated provisioning and deployment processes.

Existing IP phone provisioning and deployment services provide an automation and management of directory numbers and have limited auto-provisioning features. Most of the existing industry solutions focus on either automation of subscribed services or providing non-subscribed services, but not automation of initial provisioning of the IP phone.

For example, existing systems require a manual provisioning process that involves an administrative user removing an IP phone from its manufacturing packaging, manually reading a Media Access Control (MAC) address from the IP phone, and then providing that MAC address to a call controller. This process is labor intensive and prone to errors as MAC addresses are frequently misread.

DESCRIPTION OF EXAMPLE EMBODIMENTS

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Figure 1:
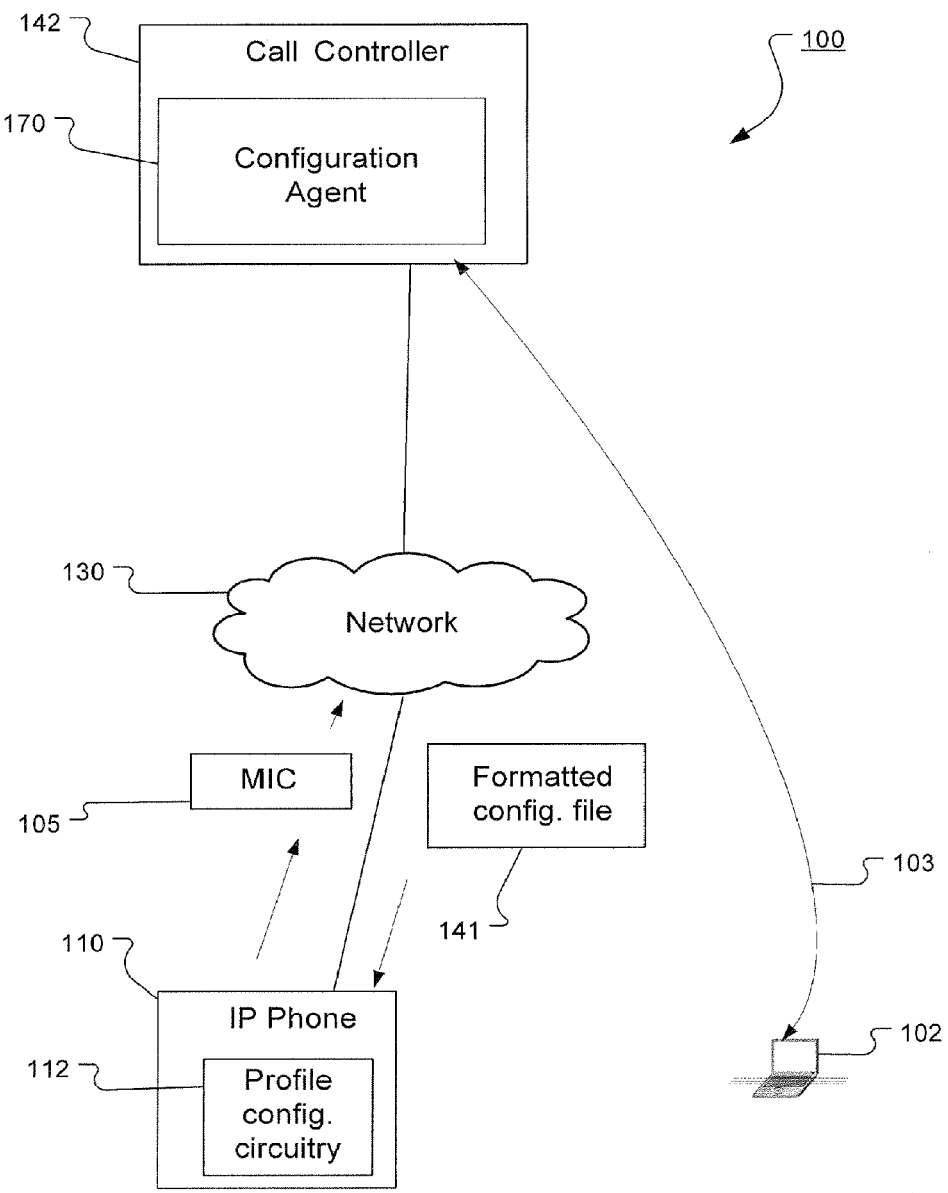
FIG. 1 illustrates an example system for secure Internet Protocol (IP) phone deployment.

FIG. 1 illustrates an example system 100 for securely deploying an Internet Protocol (IP) phone 110, or any other network device located in a packet switched network. Provisioning includes a two step process including a preparation phase and an operational phase.

In the preparation phase a phone profile is created on a call controller 142. The phone profile may be created through an out of band channel 103 to a configuration agent 170 located on the call controller 142 from a networked device 102, which may be a computer, a PDA, a cell phone, a web enabled device, etc. The phone profile is associated with a locally generated or configured Personal Identification Number (PIN). The PIN may be configured so that every time a user modifies the PIN, the user will be prompted for a One-Time Password (OTP).

In the operational phase, IP phone 110 is connected to a network 130 and is in communication with configuration agent 170. According to profile configuration circuitry 112, the IP phone 110 provides the PIN in combination with a digital signature including a Manufacturer Installed Certificate (MIC) 105 or any other locally stored certificate that includes a Media Access Control (MAC) address. The configuration agent 170 verifies the digital signature and matches the phone profile created in the preparation phase with the PIN. When there is a match, the configuration agent 170 formats the phone configuration profile with the MAC address. Finally, the configuration agent 170 provides the formatted phone configuration 141 profile for download and installation by IP phone 110.

Figure 2:
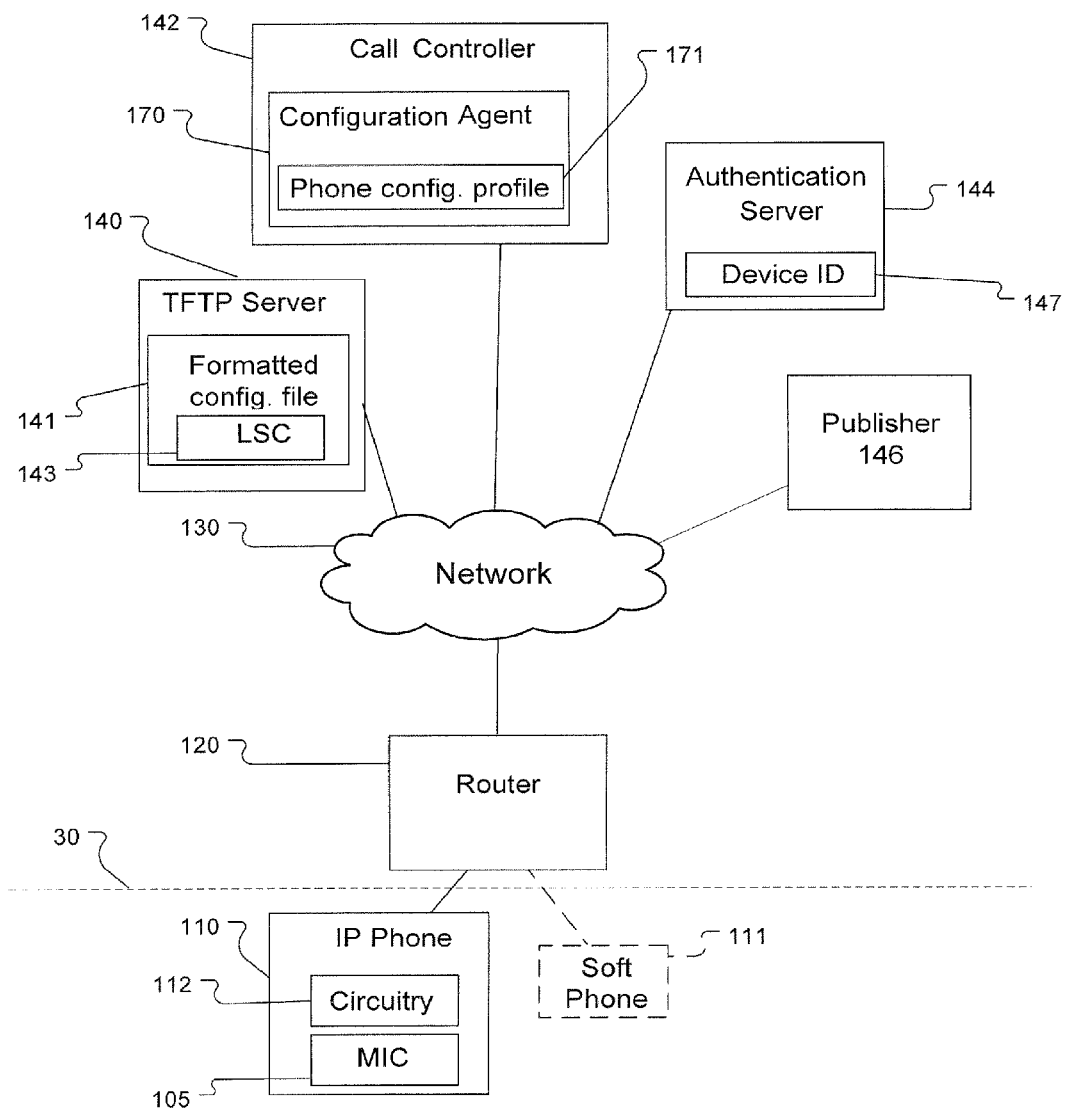
FIG. 2 illustrates another example system for secure IP phone deployment.

FIG. 2 illustrates another example system for secure IP phone deployment. FIG. 2 will be referenced by first providing a detailed description of each network device shown. Next, still referring to FIG. 2, an example operation of automatically provisioning the IP phone 110 will be provided.

DETAILED DESCRIPTION OF THE NETWORK DEVICES SHOWN IN FIG. 2

Referring to FIG. 2, and first describing the network devices located above dashed line 30, the network 130 includes the configuration agent 170 that validates credentials of a user establishing a configuration for the IP phone 110 and builds a phone configuration profile 171 for the IP phone 110. In the present embodiment, the configuration agent 170, which is also referred to as an automatic registration (AutoReg) service, is software running on the call controller 142. Although the configuration agent 170 is software in the present embodiment, in other embodiments the configuration agent 170 can be operable in hardware, firmware, etc. Moreover, configuration agent 170 may be located on any collection of devices illustrated in FIG. 2 or even on other devices.

The network 130 also includes an Enterprise Class Teleworker (ECT) router 120 that routes VoIP traffic from IP phone 110 through network 130 to call controller 142, an authentication server 144 and a file transfer server 140 such as a Trivial File Transfer Protocol (TFTP) server 140.

In the present embodiment, the TFTP server 140 is used to provide a formatted configuration file 141 to be downloaded to configure IP phone 110. In other embodiments a different network device provides the formatted configuration file 141.

The authentication server 144 creates a device identification account 147. After IP phone 110 is registered and provisioned on call controller 142, a user initiates a certificate authority proxy function application which includes prompting the user for a user identification. If the user enters the correct user identification, and if there is a valid device identification account 147 on the authentication server 144, a secure exchange of identities is started and a certificate request is transmitted to authentication server 144. The authentication server 144 may be an Authentication, Authorization and Accounting (AAA) server or any other type of authentication server.

The network may also include a publisher 146. The publisher 146 may be optionally used to verify that any digitally signed forms received from the IP phone 110 are signed by a valid certificate authority.

Still referring to FIG. 2, and now describing the network devices located below dashed line 30, the IP phone 110 includes circuitry 112 for providing a PIN and the MIC 105 to supply a device identity of the IP phone 110. Providing the PIN and the MIC 105 allows the configuration server 170 to associate IP phone 110 with a locally stored phone configuration profile 171 that is generated in the preparation phase. In some embodiments IP phone 110 may instead be a software IP phone (soft phone) 111.

According to the circuitry 112, the IP phone 110 obtains a Locally Significant Certificate (LSC) 143 from authentication server 144 and a formatted configuration profile 141 and automatically provisions the phone according to the formatted configuration profile 141. In some embodiments the certificate authority may be distributed over any combination of network devices in FIG. 2.

An Example Operation of Automatically Provisioning the IP Phone

Having described each of the network devices, an example operation with reference to FIG. 2 is hereinafter provided.

During the preparation phase, an administrative user logs into the call controller 142 using user authentication credentials, such as a preconfigured username, and selects a phone configuration profile 171 template using a menu located on a web page. For example, the administrative user selects one of the provided templates corresponding to a model of the IP phone 110. The administrative user also specifies a profile containing desired services, such as ring tones, speed dial values, etc. The administrative user may make the above selections using an out of band provisioning request or any other type of communication.

Next, the configuration agent 170 assigns a phone number based on a pool associated with the selected template. The configuration agent 170 also generates an n-digit PIN, which is associated with the phone configuration profile 171 and the username within a table inside the call controller 142. At this point, the administrative user has not provided the MAC address for the IP phone 110 to the call controller 142. Thus, the administrative user does not need to unpack the IP phone 110, manually read the MAC address and manually provide that MAC address to the call controller 142 during the preparation phase. The administrative user provides the PIN to a phone user via email or any other method of communication.

An operation phase begins the phone user (who may be the same or different than the administrative user) attaches the IP phone 110 to the network 130. The IP phone 110 automatically boots up and requests an IP address and a TFTP server 140 address to request a phone configuration profile 171. When the TFTP server 140 finds that no device specific phone configuration profile 171 is available for the IP phone 110, TFTP server 140 sends a default phone configuration instead and a Universal Resource Locater (URL) for auto-registration.

The phone user then navigates to the URL to select auto-registration. The circuitry 112 then causes the IP phone 110 to connect to the configuration agent 170 and download a web page form from publisher 146. The phone user is then prompted to enter the PIN into the web page form. The user is then prompted to select "submit softkey" after entering the PIN into the web page form.

When the user selects submit softkey, the circuitry 112 automatically retrieves the local MIC 105 and appends it to the web page form. One reason for appending the MIC 105 to the web page form is to leverage the fact that the MIC 105 includes the MAC address for the IP phone 110. Thus, the MAC address for the IP phone 110 is automatically provided to the call controller 142 rather than performing the conventional manual process of unpacking the IP phone 110 and reading the MAC address during the preparation phase.

The circuitry 112 also creates a digital signature, for example an eXtensible Markup Language (XML) signature, using a public key included in the MIC 105. Next, the circuitry 112 causes the digitally signed form to be transmitted to the configuration agent 170 located on the call controller 142. The digitally signed web page form may be sent to a publisher 146 for verification that the web page form is signed by a valid certificate authority.

The call controller 142 receives the verified web page form and the configuration agent 170 matches the submitted PIN with the locally stored PIN that was generated during the preparation phase. When a match is found, the configuration agent 170 extracts the MAC address from the MIC 105. The configuration profile 171 is configured on the call controller 142 using the MAC address.

At this stage, a Simple Certificate Enrollment Protocol (SCEP) request is initiated as part of a certificate authority proxy function to obtain a Locally Significant Certificate (LSC) 143 on behalf of the user. A valid formatted configuration file 141 containing the locally significant certificate 143 is then created on TFTP Server 140 and a DataBase (DB) change notification is generated to restart the associated device. The IP phone 110 then reboots, is configured according to formatted configuration file 141, and becomes operational.

Figure 3:
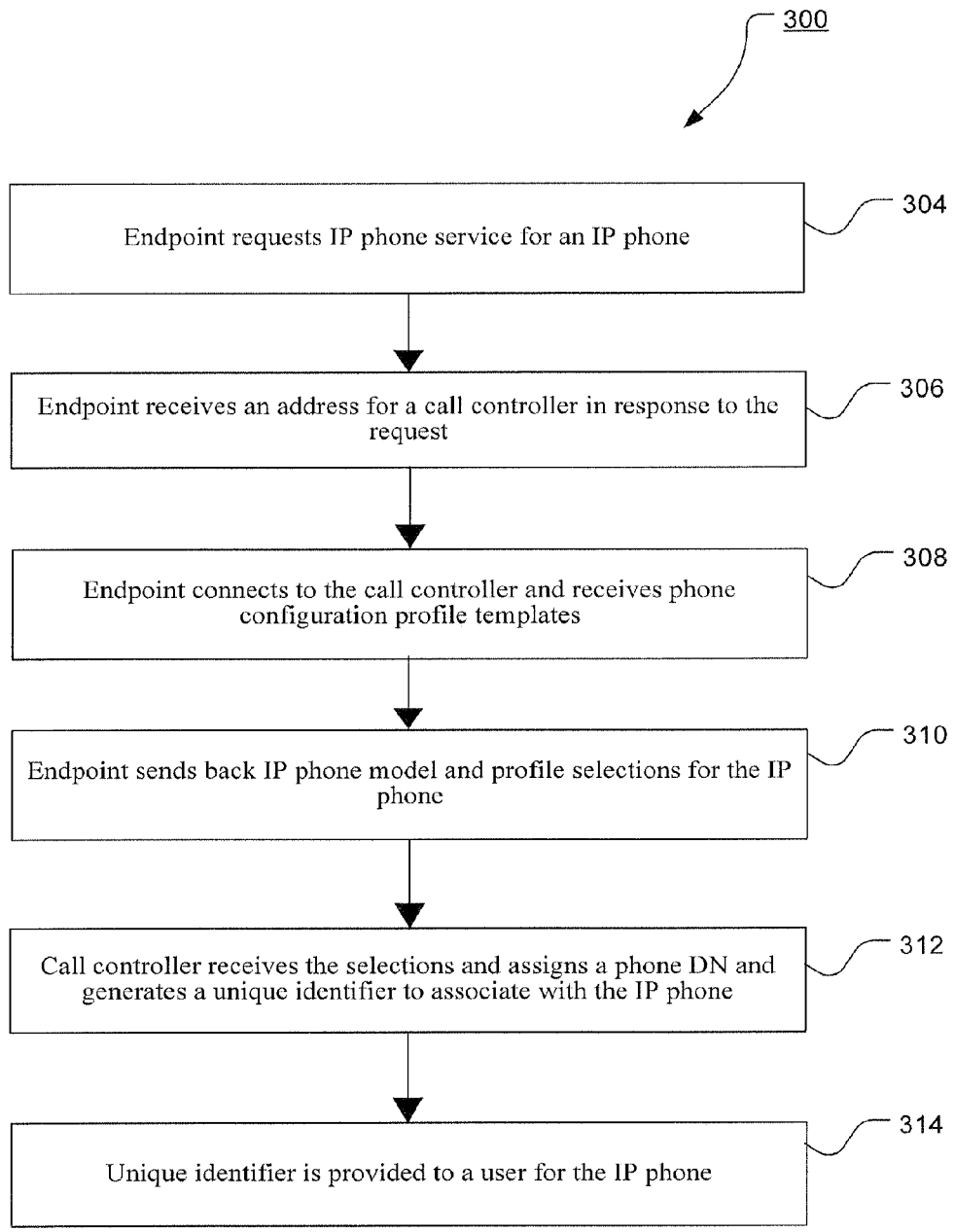
FIG. 3 illustrates an example preparation phase for an IP phone deployment using the system illustrated in FIG. 2.

FIG. 3 illustrates an example preparation phase 300 for creating a phone configuration profile 171 based on pre-built templates. The preparation phase 300 first involves an endpoint connecting to a network and requesting an IP phone service in block 304. The connection may be from any type of endpoint over an out of band channel.

In block 306, the endpoint receives an address to a call controller 142 for setting up a phone configuration profile. Once the endpoint connects to the call controller 142 using authentication credentials, a menu provides phone configuration profile templates in block 308. A phone model and profile may be selected in block 310. Example profiles include services desired such as, ring tones, speed dial values, etc.

In block 312, the system then assigns a phone number based on a pool associated with the selected template and generates a unique identifier for associating the desired phone configuration profile 171 and the IP phone 110. The unique identifier is provided to a user for the IP phone 110 in block 114, concluding the preparation phase 300.

Figure 4:
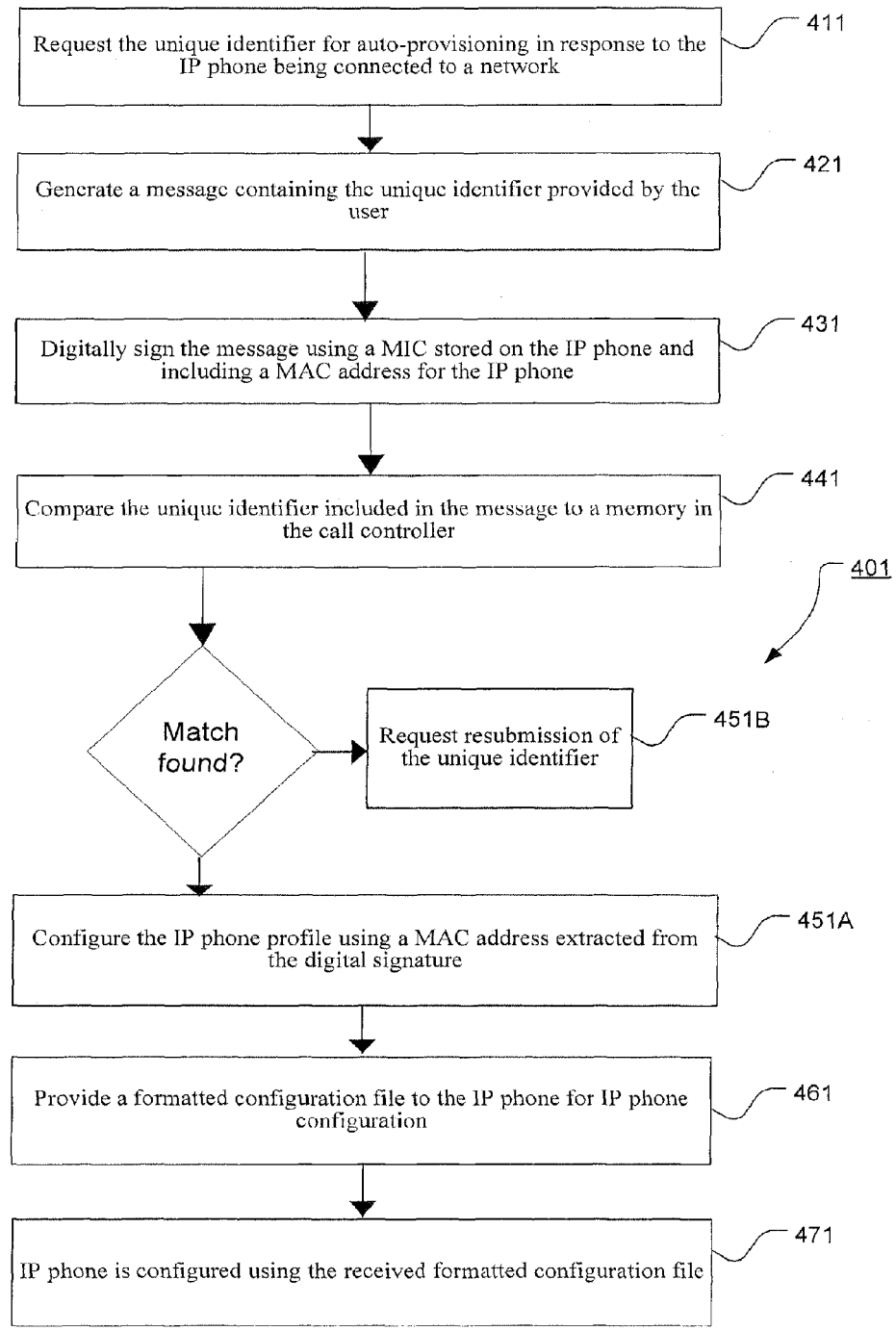
FIG. 4 illustrates an example operational phase for an IP phone deployment using the system illustrated in FIG. 2.

FIG. 4 illustrates an example operational phase 401 for auto-provisioning the IP phone 110. In block 411, the circuitry 112 automatically requests the unique identifier in response to the IP phone 110 being connected to a network. Next, the circuitry 112 generates a message containing the user-provided unique identifier in block 421. In block 431, the circuitry 112 digitally signs the message using a MIC that includes a MAC address and that is stored locally in non-volatile memory on the IP phone 110. Digital signatures include public-key digital signature techniques and message authentication codes.

The configuration agent 170 receives the digitally signed message, and in block 441, compares the submitted unique identifier included in the digitally signed message to a value in a local memory. When there is no match, the configuration agent 170 requests resubmission of the unique identifier in block 451B. Alternatively, the configuration agent 170 sends a message recommending a manual provisioning for the IP phone 110.

When there is a match, in block 451A the configuration agent 170 locally configures the IP phone profile using the MAC address extracted from the digital signature. The configuration agent 170 may also verify the digital signature before extracting the MAC address. The configuration agent 170 registers the IP phone 110 and in block 461 provides a formatted configuration file containing a Locally Significant Certificate (LSC) to the IP phone 110 for IP phone configuration. The IP phone 110 is configured using the formatted configuration file in block 471.

Figure 5:
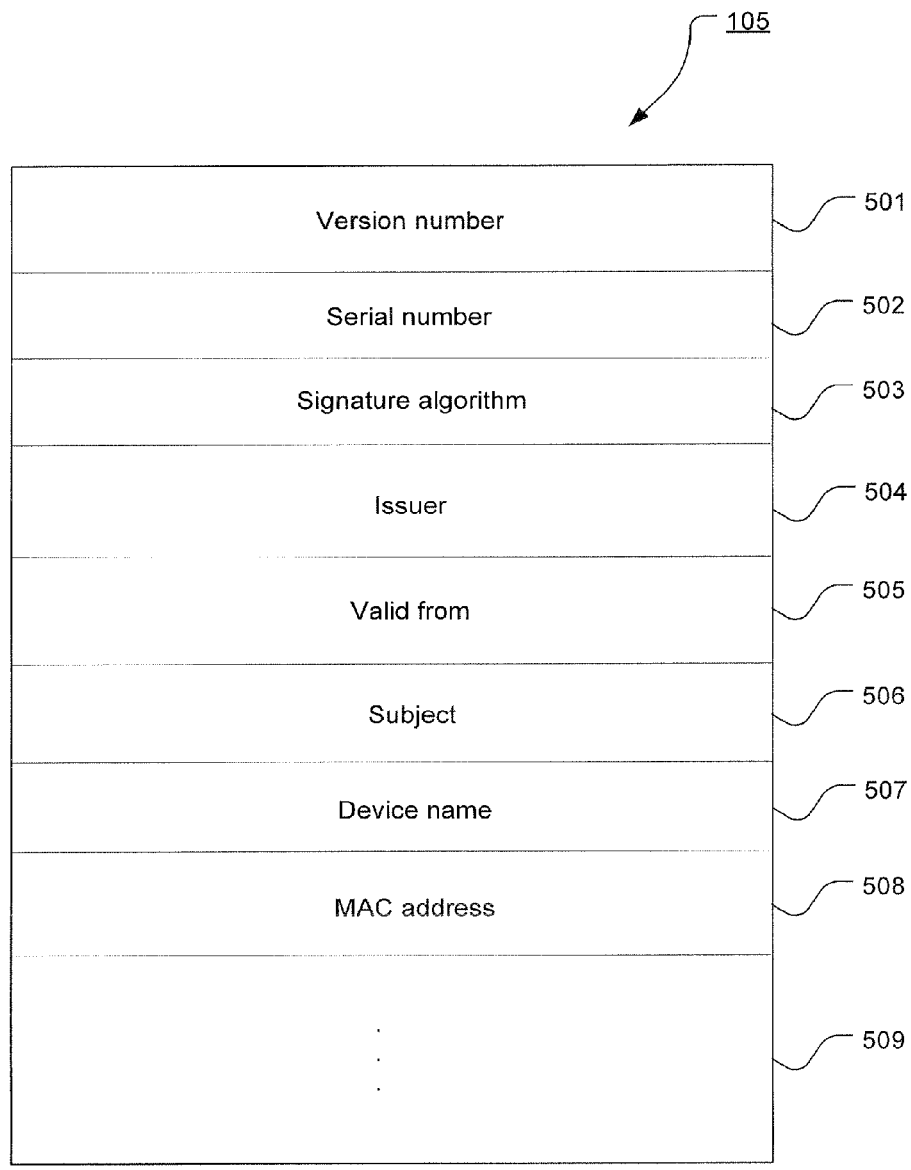
FIG. 5 illustrates an example Manufacturer Installed Certificate (MIC).

FIG. 5 illustrates an example Manufacturer Installed Certificate (MIC) 105.

The MIC 105 is included in a non-volatile memory of the IP phone 110 during manufacture of the IP phone 110. The MIC 105 is generally included in the IP phone 110 for use during authentication, encryption and non-repudiation, which prevents a device from repudiating use of an included key. In the present embodiment, the MIC 105 is a digital certificate conforming to the X.509 standard. However, importantly, in other embodiments any type of manufacturer installed certificate or other manufacturer installed unique identifier may be used instead of the MIC 105.

The MIC 105 includes a version number field 501, a serial number field 502 containing a serial number and a signature algorithm field 503. The signature algorithm field 503 specifies which algorithm a validating device uses to validate the MIC 105. In the present example, the field 503 is set to Rivest, Shamir and Adleman 1 (RSA-1).

The MIC 105 also includes an issuer field 504 that includes the name of the manufacturer that included the MIC 105 in a non-volatile memory of the IP phone 110. Also included are the valid from field 505, the subject field 506, and the device name field 507, which includes a model number of the IP phone 110.

Finally, the MIC 105 includes a MAC address field 508 that includes a MAC address for the IP phone 110. The call controller uses this field to automatically extract the MAC address for the IP phone 110 instead of requiring a user to unpack the IP phone 110 and manually read a MAC address. The MIC 105 also contains other fields denoted by numeral 509. The fields denoted by numeral 509 contain other information such as public key value information.

Figure 6:
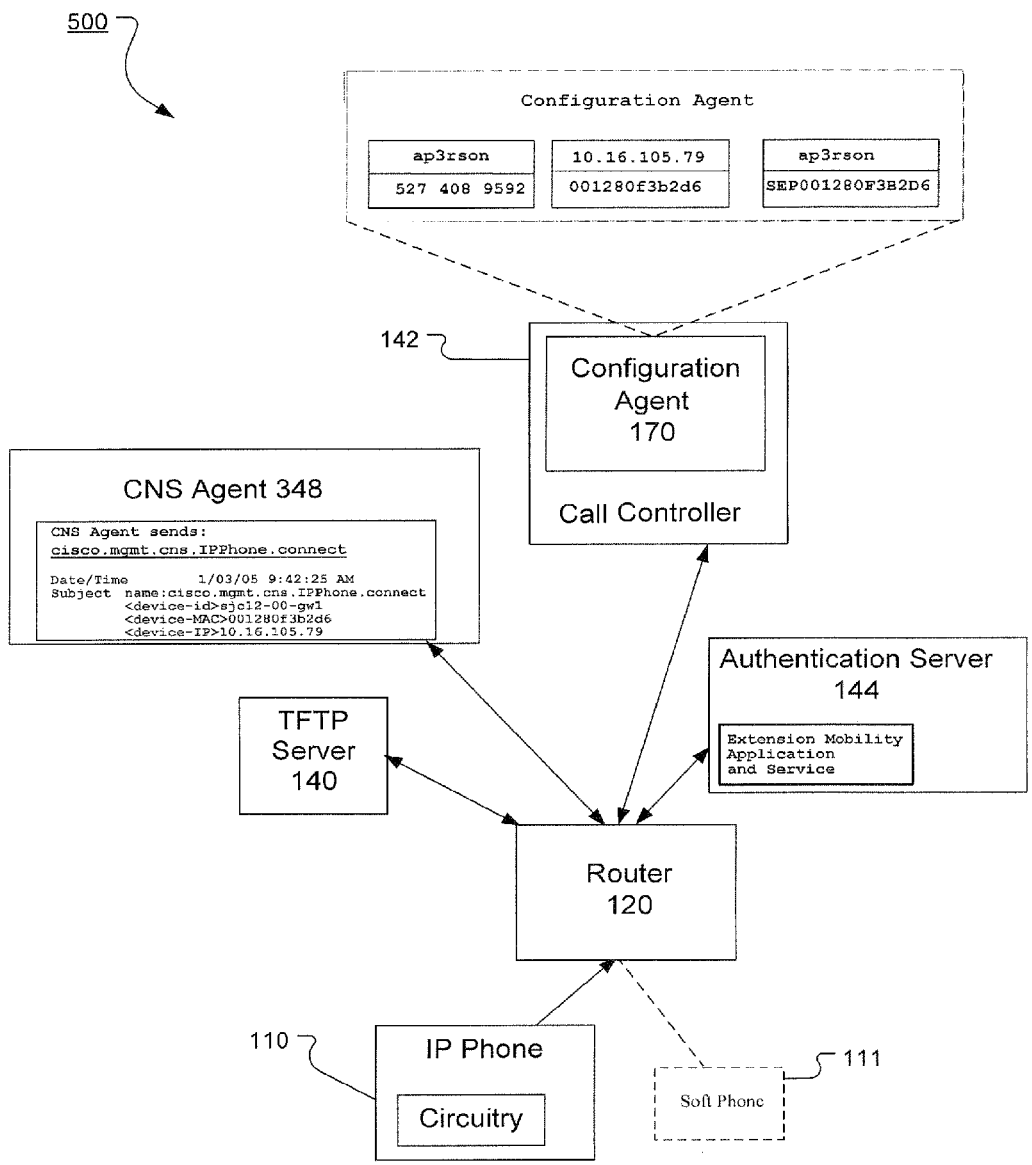
FIG. 6 illustrates an example IP phone deployment using an Extension Mobility (EM) application.

FIG. 6 illustrates example IP phone deployment using an Extension Mobility (EM) application. This example has similar architecture to the previous examples but utilizes EM which allows users to configure a device with their own settings simply by logging into that device and further allows users to change device settings without having to use a manager service such as call controller. Thus, when EM is used, an addition to the preparation stage, as compared to the example illustrated in FIG. 3, is that the user applies for EM and obtains a PIN number to associate with the phone.

Additionally, this example may use a networking service, such as a Cisco Networking Services (CNS) agent 348, for certain configuration steps. The CNS agent 348 may update the configuration agent 170 with identifying information about the IP phone 110, such as a switch ID, a MAC address, an IP address, etc. The configuration agent 170 then associates this information with the username and phone DN, and automatically configures IP phone 110 in a similar fashion as described above.

According to the present example, ECT router 120 uses an operating system that detects certain protocols, such as Session Initiation Protocol, SKINNY, Real-Time Protocol, etc., and auto-generates Access Control Lists (ACL) for the IP phone 110 over an authentication proxy for the protocols and service URLs. In this fashion the router 120 then provides the MAC address and the IP address of the IP phone 110.

Figure 7:
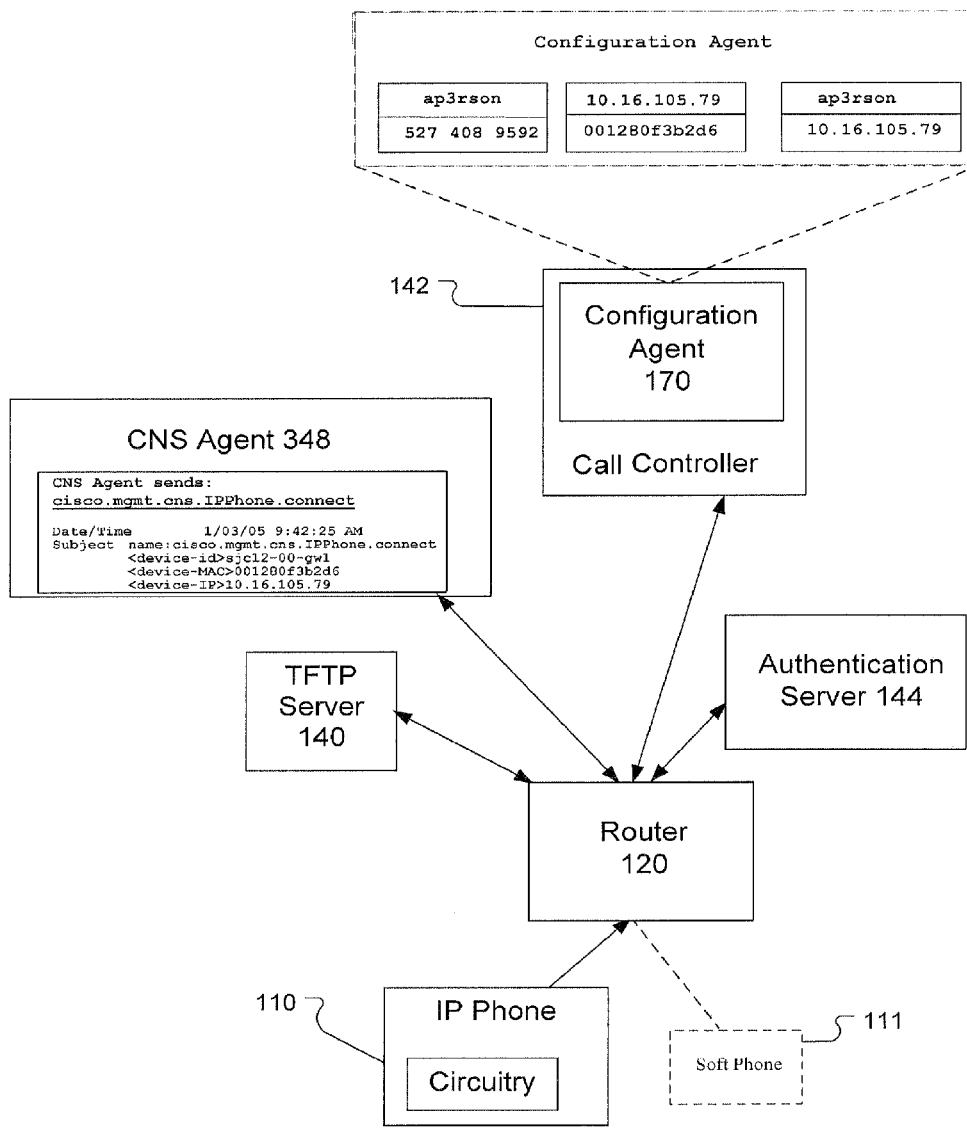
FIG. 7 illustrates an example IP phone deployment using an Authentication Authorization and Accounting (AAA) server.

FIG. 7 illustrates an example IP phone deployment using an Authentication Authorization and Accounting (AAA) server. This example utilizes an AAA request and response to coordinate the IP phone 110 with the correct configuration parameters. This approach does not require the EM aspects in the preparation phase as did the example illustrated in FIG. 6, but it may also use the OS of router 120 in similar fashion to detect certain protocols, such as Session Initiation Protocol, SKINNY, Real-Time Protocol, etc., and to auto-generate Access Control Lists (ACLs) for the IP phone 110 over an authentication proxy for the protocols and service URLs. In this fashion the router 120 then provides the MAC address and the IP address of the IP phone 110.

Figure 8:
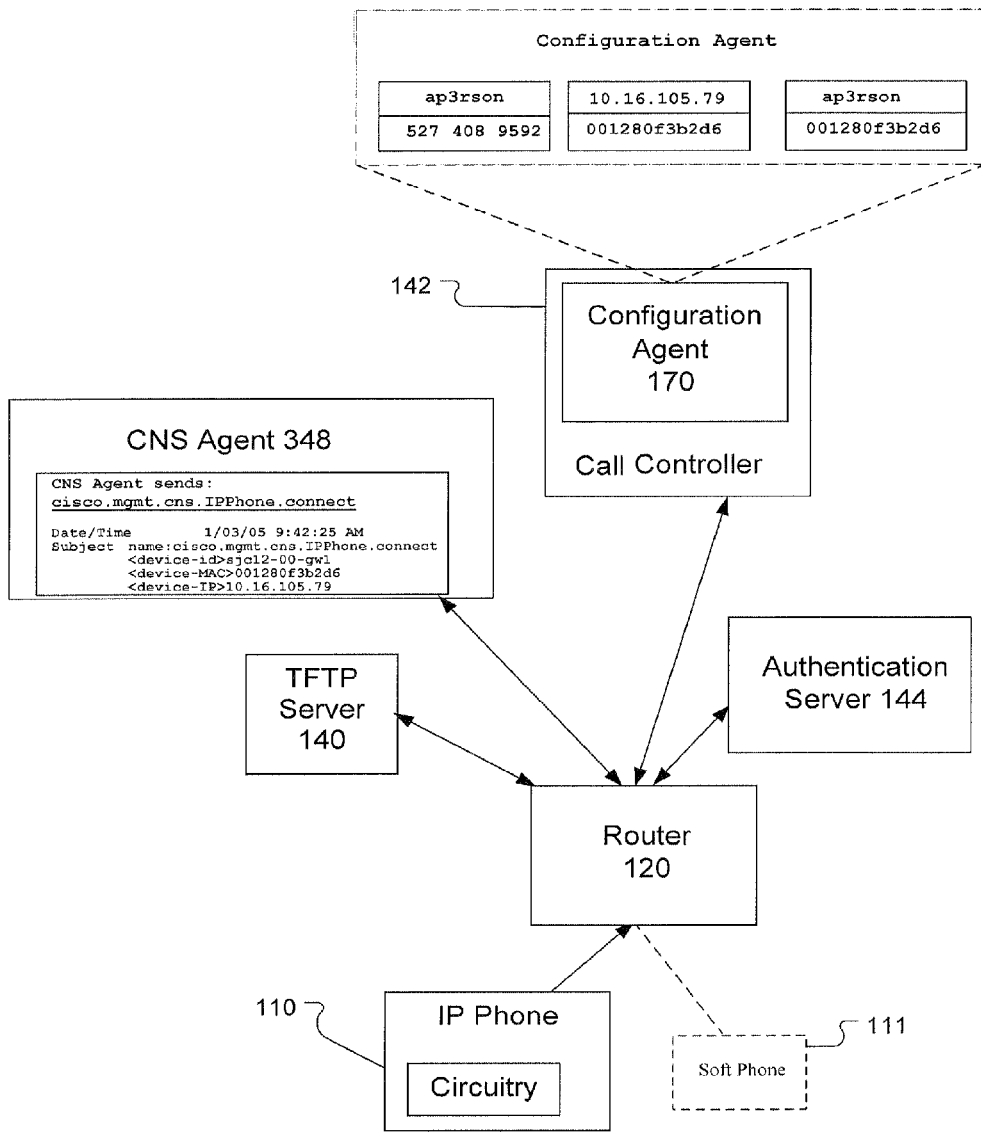
FIG. 8 illustrates an example IP phone deployment using an 802.1x protocol.

FIG. 8 illustrates an example IP phone deployment using an 802.1x protocol. The 802.1x example typically uses a CNS agent 348 and a similar preparation phase as the AAA example in FIG. 7, as well as similar router 120 operating system functionality as the EM example illustrated in FIG. 6 or the AAA example illustrated in FIG. 7.

Various other combinations of these devices are within the scope of the present invention as illustrated in the appended claims. For example, the IP phones 110 may reside on router 120, the configuration agent 170 may reside on the call controller 142, or run on any of the other hardware in the figure or even other hardware not shown. The configuration agent 170 and the auto registration service may be implemented in the same software or hardware. Additionally, any of TFTP server 140, call controller 142, authentication server 144 may operate as separate functionalities on the same physical device, there may be a direct connection from router 120 to any of the servers without going through a network, etc. as examples.

Referring back to FIG. 2, alternate examples may use another built-in identity of an IP phone 110 instead of the manufacturer installed certificate 105. Some examples may use a software phone, such as soft-phone 111 running on a device. Additionally, in alternate examples configuration agent 170 may be in hardware, electronic signals sent from another device, firmware, etc.

Some examples of the present invention provide a secure, automated, and low-cost IP phone 110 deployment, suitable for end-to-end large-scale deployments. These examples maintain security during and after the deployment process. Furthermore, examples are easily merged with existing directory management solutions or PKI solutions. By automating deployments, examples reduce the total cost of ownership significantly.

The present invention may be embodied in other specific forms without departing from its spirit or essential characteristics. The described examples are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

We claim:

1. An apparatus comprising:
a non-volatile memory containing a manufacturer installed certificate that includes an address for the apparatus and a model number for the apparatus; and
logic encoded in one or more tangible media for execution and when executed operable to:
generate a message including a unique identification number;
digitally sign message using the manufacturer installed certificate that contains the address for the apparatus;
receive a configuration profile for the apparatus in response to the message, the configuration profile containing a locally significant certificate; and
configure the apparatus with the configuration profile.

2. The apparatus of claim 1 wherein the logic is further operable to automatically request the unique identification number in response to the apparatus being connected to a packet switched network.

3. The apparatus of claim 1 wherein the logic is further operable to create an XML signature using a private key corresponding to a public key located in the manufacturer installed certificate.

4. A method comprising:
generating a message including a unique identification number based in part on a model number of an internet protocol (IP) phone;
signing digitally the message using the manufacturer installed certificate that contains the address for the IP phone;
receiving a configuration profile for the IP phone in response to the unique identification number matching the configuration profile, the configuration profile containing a locally significant certificate; and
configuring the IP phone with the configuration profile.

5. The method of claim 4, further comprising:
automatically requesting the unique identification number in response to the IP phone being connected to a packet switched network.

6. The method of claim 4, further comprising:
creating an XML signature using a private key corresponding to a public key located in the manufacturer installed certificate.

7. A method comprising:
storing a manufacturer installed unique value containing a local address;
generating a message including a user-entered unique identifier;
attaching the manufacturer installed unique value containing the local address to the generated message;
receiving a configuration profile for the IP phone; and
configuring the apparatus with the configuration profile, wherein the manufacturer installed unique value contains a model number for the IP phone.

8. The method of claim 7, wherein the manufacturer installed unique value contains a field identifying a manufacturer of the IP phone.

9. The method of claim 7, wherein the manufacturer installed unique value contains an algorithm field that identifies an algorithm for validating the manufacturer installed unique value.

10. The method of claim 7, wherein the manufacturer installed unique value includes a valid form field.

11. The apparatus of claim 1, wherein the model number is for an internet protocol (IP) phone.

* * * * *